United States Patent [19]
Clocksin et al.

[11] Patent Number: 5,955,011
[45] Date of Patent: Sep. 21, 1999

[54] EVAPORATIVE COOLING APPARATUS AND METHOD FOR A FINE FIBER PRODUCTION PROCESS

[75] Inventors: Kenneth Andrew Clocksin, Grand Rapids, Ohio; Michael J. Cusick, Englewood, Colo.

[73] Assignee: Johns Manville International, Inc., Denver, Colo.

[21] Appl. No.: 08/738,941

[22] Filed: Oct. 24, 1996

[51] Int. Cl.⁶ .................................................. B29B 9/00
[52] U.S. Cl. .................. 264/6; 65/465; 65/468; 65/524; 65/528; 165/58; 264/12; 264/518; 425/7
[58] Field of Search ................... 264/6, 12, 518; 425/7; 65/465, 468, 524, 528; 165/58

[56] References Cited

U.S. PATENT DOCUMENTS 3,902,878  9/1975  Hoag, Jr. et al. .................. 65/524 X
3,959,421  5/1976  Weber et al. ........................... 264/6

*Primary Examiner*—Leo B. Tentoni
*Attorney, Agent, or Firm*—Cornelius P. Quinn

[57] ABSTRACT

Fine fibers are formed and carried in a high energy, high temperature gaseous stream to a primary fine fiber collection surface where fine fibers are collected from the gaseous stream. Gases of the gaseous stream along with fine fibers not removed from the gaseous stream by the primary collection surface are drawn through the primary collection surface and formed into an exhaust gas stream which is passed through a secondary fine fiber collection surface to remove additional fibers from the exhaust gas stream before it is discharged to the atmosphere. To reduce the operating temperatures at and surrounding the primary and secondary collection surfaces, the gas streams are cooled by evaporative cooling. Water is sprayed into the gas streams by nozzles, shielded from the gas streams by scoops, so that fibers do not collect on the nozzles and form fiber wads. The spray droplets are sized so that the droplets evaporate before the gas stream being cooled impacts a collection surface so that the fine fibers remain dry.

26 Claims, 2 Drawing Sheets

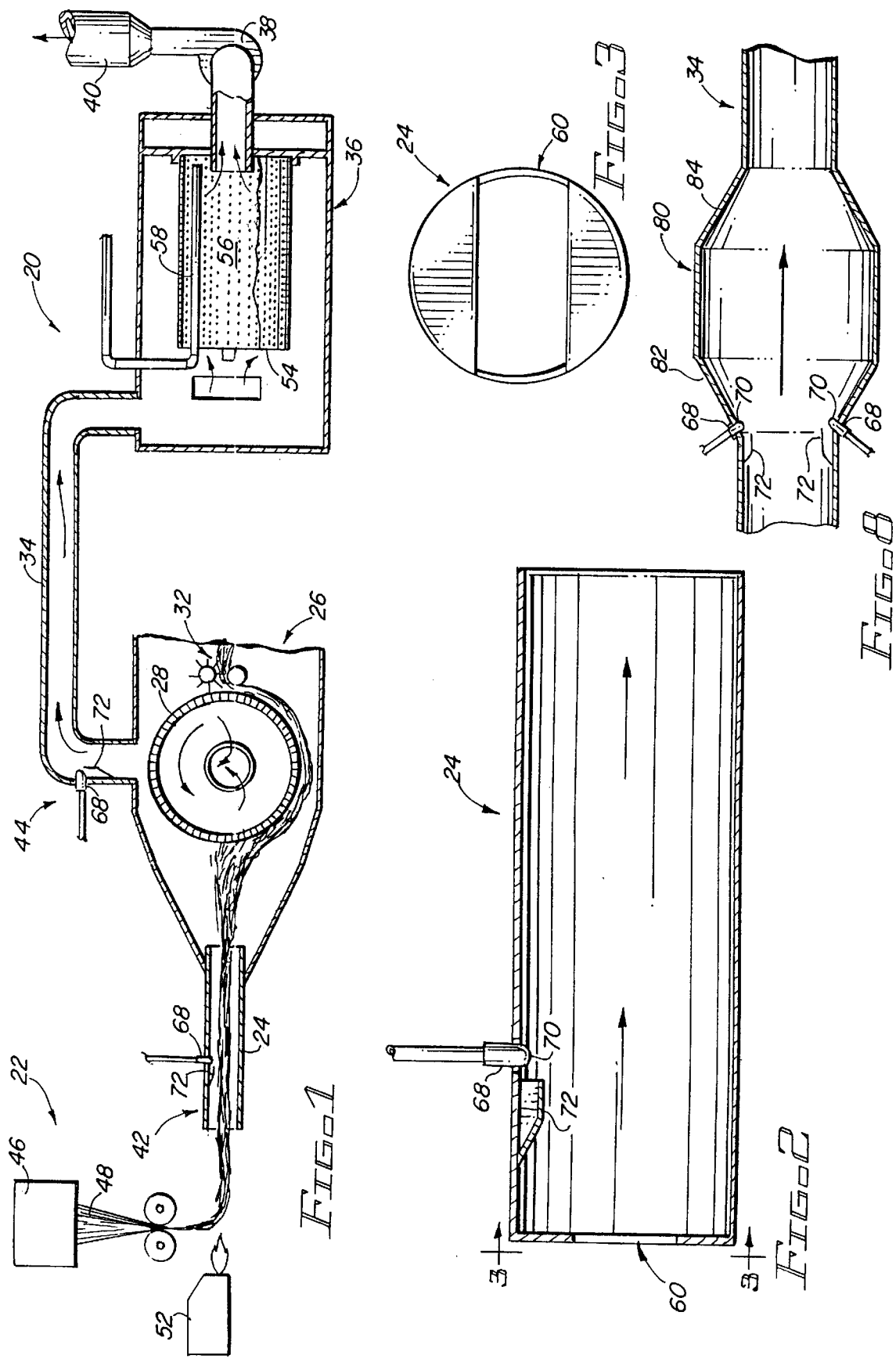

DUCT FLOW

5,955,011

EVAPORATIVE COOLING APPARATUS AND METHOD FOR A FINE FIBER PRODUCTION PROCESS

BACKGROUND OF THE INVENTION

The present invention relates to an apparatus for and a method of making and collecting fine fibers, e.g. microfibers, and, in particular, to an apparatus for and a method of making and collecting fine fibers wherein the high energy, high temperature gas streams carrying the fine fibers are cooled, without wetting the fine fibers, to reduce the temperatures at and surrounding the primary and secondary fine fiber collection equipment used in the process.

Fine fibers, such as microfibers having mean diameters between about 0.5 and 2.0 microns and other fine fibers having mean diameters of about 7 microns or less, are made from glass, high temperature resistant ceramic materials, organic (carbon based) materials, polymers and other fiberizable materials. These fine fibers are typically made by a process, such as a flame attenuation process, wherein filaments or fibers are heated and attenuated by a high energy hot gaseous blast and carried by a gaseous stream of combustion gases and inspirated air to a collection surface where the fine fibers are separated from the gaseous stream and collected on the collection surface. Typically, the fine fibers are collected as a mat of randomly oriented fibers which is later removed from the collection surface and delivered to a windup mandrel or pneumatic conveying system for packaging or further processing.

One flame attenuation process used to form such fine fibers involves the formation of continuous, relatively large diameter filaments which are formed by pulling the filaments from fiberizing orifices in the bottom of a heated pot or melter, containing a molten fiberizable material, by pull rolls. The continuous filaments are then fed into the hot, high energy gaseous blast of a burner where the continuous, relatively large diameter filaments are attenuated, formed into discrete length fibers, and carried through forming tubes toward a primary fine fiber collection equipment by the combustion gases from the burner and inspirated air. While other filtration means can be used to separate the fine fibers from the gaseous stream of combustion gases and inspirated air, typically, the primary fine fiber collection equipment is a rotating metallic collection drum with a perforated, cylindrical collection surface.

A negative pressure is created within the rotating metallic collection drum by means of an exhaust system, connected to the interior of the collection drum, which withdraws gases from the interior of the collection drum. The negative pressure within the collection drum draws the gases of the fine fiber containing gaseous stream through the perforations in the collection surface thereby separating the gases from most of the fine fibers in the gaseous stream which are collected into a mat of randomly oriented fibers on the primary collection surface. The mat of fine fibers is subsequently removed from the primary collection surface by a doffing and smooth roll assembly and delivered to a windup mandrel or a pneumatic conveying system for packaging or further processing.

In the past, the exhaust gases from the primary collection equipment, carrying fine fibers not removed from the gasses by the primary collection equipment, have been passed through wet scrubber exhaust gas abatement equipment to remove fine fibers from the exhaust gases and clean the exhaust gases. The cleaned gases were then discharged to the atmosphere through an exhaust stack. The use of wet scrubbers, as exhaust gas abatement equipment in a fine fiber production process, causes a number of problems. Typically, the volume of air and combustion gases passing through the primary collection equipment and into the exhaust system to be cleaned by the exhaust gas abatement equipment ranges from about 20,000 to about 60,000 ACFM (actual cubic feet per minute). A wet scrubber used as the exhaust gas abatement equipment in such a process must be operated at a high pressure drop across the scrubber, about 16 inches of water column, to achieve a filtration efficiency of about 90% for fiber five microns in diameter and above. Thus, the operation of a wet scrubber in such a process is expensive. In addition, fine fibers such as glass microfibers, are hydrophilic and once these fibers are wetted by the scrubber, the fibers are no longer useable in a product and become scrap. Another problem associated with the use of a wet scrubber to clean exhaust gases in a fine fiber production process is the creation of clumps of wet fibers in the exhaust system which can be discharged through the exhaust stack. The water used in a wet scrubber absorbs volatiles from the exhaust gases and becomes waste water which must be treated and from an aesthetic point of view, the steam discharged from the exhaust stack of the process can be unsightly.

In fine fiber production processes, such as the flame attenuation process discussed above, not only does the process have to handle large volumes of gases, e.g from about 20,000 to about 60,000 ACFM traveling at speeds of up to about 500 feet per minute, but the ambient or surrounding temperature in the fine fiber collection chamber at the primary collection equipment, due to the high temperatures of the combustion gases typically ranges from about 350° F. to about 550° F. and the temperatures of the exhaust gases passing from the primary collection equipment to the exhaust gas abatement equipment ranges from about 300° F. to about 500° F. The temperatures are typically at the higher end of the ranges in the hotter summer months.

Thus, there has been a need to cool the gaseous stream of combustion gases and inspirated air carrying the fine fibers to the primary collection equipment so that the fine fiber collection equipment can be operated at lower temperatures to prolong the service life of seals, the doffing roll and other parts of the primary collection equipment adversely effected by high temperatures. There has also been a need to cool the exhaust gases so that exhaust gas abatement equipment other than wet scrubbers, such as dry filter drums, can be effectively used to remove fine fibers, remaining in the exhaust gases, from the exhaust gases without wetting the fine fibers. By removing the fine fibers from the exhaust gases without wetting the fine fibers, the fine fibers thus removed from the exhaust gases can be collected and used in products. The exhaust gas abatement equipment can thereby function not only as a means to remove fine fibers from the exhaust gases but also as a secondary collection system for the process to reduce the amount of scrap fibers produced by the process.

SUMMARY OF THE INVENTION

The evaporative cooling apparatus and method of the present invention solve the above discussed problems by providing a way of cooling the gases in the process, without wetting the fine fibers, so that the temperatures of the fine fiber containing gaseous stream of combustion gases and inspirated air impacting the primary collection equipment and of the exhaust gases being cleansed by the exhaust gas abatement equipment are both reduced. This prolongs the service life of seals, doffing rolls and other components of the primary collection equipment and the service life of filter media and other components of dry drum filtration equipment or similar filtration equipment which can be used as exhaust gas abatement equipment to remove fibers from the exhaust gases without wetting the fibers so that the fibers can be used in products.

In one embodiment of the fine fiber production process of the present invention, the fine fiber containing high energy, high temperature gaseous streams of combustion gases and inspirated air are cooled by evaporative cooling before the gaseous streams impact the primary fine fiber collection surface or filter media of the primary fine fiber collection equipment. In this embodiment, the gaseous stream is cooled as it passes from the fiber forming equipment to the primary fine fiber collection equipment through forming tubes.

Water spray nozzles, shielded from the gaseous streams by nozzle scoops, spray water into the gaseous streams without wetting the fine fibers or the inner surfaces of the forming tubes. By shielding the nozzles from the gaseous streams and by not wetting the inner surfaces of the forming tubes, clumps of wet fibers do not build up on the nozzles or on the inner surfaces of the forming tubes to be later carried away by the gaseous streams to impact against the primary collection surface or filter media where the clumps would clog the perforations in the collection surface or the filter media and ruin the product. The nozzle scoops also create a venturi effect within the forming tubes adjacent the spray nozzles to draw air into the forming tubes through the nozzle ports where the nozzles are located. The air, inspirated into the forming tubes through these ports, also prevents fibers from the gaseous stream from collecting into clumps on the nozzles. The droplets of the nozzle sprays are sized so that the droplets evaporate before impacting the primary fine fiber collection surface or filter media so that the collection surface or filter media are not wetted. Any wetting of the collection surface or filter media would also cause the fine fibers to form into clumps thereby clogging the perforations in the collection surface or the interstices of the filter media and ruining the product.

In this embodiment of the present invention, the evaporative cooling of the fine fiber containing gaseous stream carrying the fine fibers to the primary collection equipment reduces the temperatures surrounding the primary fine fiber collection equipment and the exhaust gases removed from the primary fine fiber collection equipment and passed through the exhaust gas abatement equipment. Thus, the operating temperatures for both the primary fine fiber collection equipment and the exhaust gas abatement equipment are reduced thereby prolonging the service life of such equipment and improving the efficiency of the production process.

In a second embodiment of the present invention, the exhaust gases from the primary fine fiber collection equipment, carrying fine fibers not collected by the primary fine fiber collection equipment, are cooled by evaporative cooling prior to being introduced into the exhaust gas abatement equipment. The exhaust gases are cooled as they flow from the primary fine fiber collection equipment to the exhaust gas abatement equipment through an exhaust duct.

One or more, preferably a plurality, water spray nozzles, each shielded from the exhaust gas stream by a nozzle scoop, spray water into the exhaust gas stream without wetting the fine fibers or the inner surface of the exhaust duct. By shielding the one or more nozzles from the exhaust gas stream and by not wetting the inner surface of the exhaust duct, clumps of wet fibers do not build up on the nozzle or nozzles or on the inner surface of the exhaust duct to be later carried away by the exhaust gas stream to impact against the filter media of the exhaust abatement equipment where the clumps would clog the fibrous filter media. The nozzle scoop or scoops also create a venturi effect within the exhaust duct adjacent the spray nozzles to draw air into the exhaust duct through the nozzle ports where the nozzles are located. The air inspirated into the exhaust duct through these ports also prevents fibers in the exhaust gas stream from collecting into clumps on the nozzles. The droplets of the sprays from the nozzles are sized so that the droplets evaporate before impacting the filter media of the exhaust gas abatement equipment so that the filter media is not wetted. Any wetting of the filter media would also cause the fine fibers to form into clumps or wads on the filter media thereby clogging the interstices of the filter media.

In this second embodiment of the present invention, the evaporative cooling of the fine fiber containing exhaust gas stream reduces the temperatures surrounding the exhaust gas abatement equipment. In addition, since the gases passing through the fine fiber forming process are drawn through the process by an exhaust fan or fans in the exhaust gas system located downstream of the location where the exhaust gases are cooled, for a constant volume of gases passing through the exhaust fan or fans more air mass will be inspirated into the combustion gases and air passing through the primary fine fiber collection equipment thereby cooling the primary fine fiber collection equipment. Thus, the operating temperatures for both the primary fine fiber collection equipment and the exhaust gas abatement equipment are reduced thereby prolonging the service life of such equipment and improving the efficiency of the production process.

In a third embodiment of the present invention, both the gaseous stream of combustion gases and air carrying the fine fibers to the primary fine fiber collection equipment and the exhaust gas stream carrying fine fibers, not removed from the gases by the primary fine fiber collection equipment, to the exhaust gas abatement equipment (the secondary fine fiber collection equipment) are cooled by evaporative cooling.

BRIEF DESCRIPTION OF THE DRAWINGS

FIG. 1 is a schematic view of the fine fiber forming process of the present invention with evaporative cooling equipment in the forming tubes and the exhaust duct of the process.

FIG. 2 is a schematic side view of a forming tube with the evaporative cooling equipment of the present invention.

FIG. 3 is an end view of the forming tube of FIG. 2, taken substantially along lines 3—3 of FIG. 2.

FIG. 8 is a schematic side view of a preferred installation of the evaporative cooling equipment in the exhaust duct.

DESCRIPTION OF THE PREFERRED EMBODIMENTS

Figure 5:
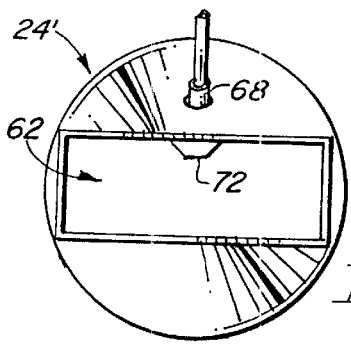
FIG. 5 is an end view of the forming tube of FIG. 2, taken substantially along lines 3—3 of FIG. 2.

As shown in FIG. 1, a flame attenuation, fine fiber forming production line 20, employing the evaporative cooling system and method of the present invention, includes: fine fiber forming equipment 22; a series of forming tubes 24; a collection chamber 26 enclosing a primary fine fiber collection drum 28; a doffing and smooth roll assembly 32 for removing fine fibers from the collection drum 28 and delivering the fine fibers to a windup mandrel or pneumatic conveying system (not shown) for packaging or further processing; an exhaust duct 34; exhaust gas abatement equipment 36; an exhaust fan 38; and an exhaust stack 40. The forming tubes are provided with an evaporative cooling system 42 and the exhaust duct 34 is provided with an evaporative cooling system 44.

The fine fiber forming equipment 22, shown in FIG. 1, includes melters or pots 46 which are typically heated with a gas burner or electrical heating elements to maintain the fiberizable material within the melters or pots 46 at an appropriate fiberizing temperature. The bottom walls of the melters or pots 46 are each provided with a large number of fiberizing orifices from which relatively large diameter continuous filaments 48, commonly referred to as primary filaments, are pulled or drawn by driven pull rolls 50. After passing through the pull rolls 50, the continuous filaments 48 are introduced into the flames of flame attenuation burners 52, e.g. Selas or similar burners. The high energy, high temperature flames of the flame attenuation burners 52 attenuate the filaments 48 and form fine fibers which are carried by the combustion gases into and through the forming tubes 24 to impact against the perforated collection drum 28 within the collection chamber 26. While the fine fiber forming process shown in FIG. 1 is one type of a flame attenuation process, the fine fibers can also be formed by flame attenuation rotary or similar fiberization processes.

The fine fibers made by these processes have mean diameters of about 7 microns or less and are made of glass, high temperature resistant ceramic materials, polymers, organic (carbon based) materials or other suitable fiberizable materials. Processes, such as the one shown in FIG. 1, are especially suited for forming and collecting very fine fibers called microfibers which are normally very difficult to collect. Microfibers have mean diameters between about 0.5 microns and 2 microns and have aspect ratios of length to diameter of about 10× to about 10,000×. However, these processes are also well suited for forming and collecting fine fibers having mean diameters between about 0.5 microns and 7 microns and aspect ratios of length to diameter of 10× and greater.

The fiber collection drum 28 is a rotating tubular drum typically about six feet in diameter by about eight feet in length and has a perforated metal cylindrical collection surface that functions as the primary fine fiber collection surface for the process, such as drums marketed by Continental Corporation. Typically, the doffing and smooth roll assembly 32 removes the collected fine fibers from the perforated collection surface of the drum and delivers the fine fibers to a windup mandrel or pneumatic conveying system (not shown) for packaging or further processing. While this is a preferred means of collecting the fine fibers, other fine fiber collection surfaces or filter media, capable of effectively and efficiently removing low concentrations of fine fibers from a high energy, high temperature gaseous stream and collecting such fibers for packaging or further processing can also be used as the primary fine fiber collection equipment.

The distance from the fiber attenuation zone of the fine fiber forming equipment 22 to the collection surface of the fine fiber collection drum 28 is typically quite short, about 10–12 feet, and the fine fiber containing gaseous stream of combustion gases and inspirated air typically travels at velocities of up to about 500 feet per minute and temperatures from about 350° F. and 550° F. The volumes of combustion gases and inspirated air passing though the collection surface of the collection drum, to collect about 50 to 150 pounds of fine fibers per hour, ranges from about 20,000 to about 60,000 ACFM. Thus, cooling the high volumes of high temperature gases in the fine fiber containing gaseous stream, without wetting the fine fibers or the collection surface, typically, must be accomplished within a fraction of a second.

In a manufacturing operation using the method and apparatus of the present invention, the fiber containing gaseous streams of the combustion gases and inspirated air for six forming tubes were cooled using one spray nozzle per forming tube and a total of 1.1 gallons/minute of cooling water for the six forming tubes. When used, the evaporative cooling equipment of the present invention reduced the temperatures at the collection drum from 434° F. to 399° F, a drop of 35° F., and no wet fiber wad formation was observed. The exhaust fan 38 of the exhaust system withdraws or pulls gases (the combustion gases and inspirated air) from the interior of the rotating collection drum 28 through the exhaust duct 34 to a chamber housing the exhaust gas abatement equipment 36 and through the exhaust gas abatement equipment, where fine fibers in the exhaust gases are removed from the exhaust gases, before the exhaust gasses are discharged out through the exhaust stack 40. The exhaust fan 38 is a conventional, commercially available exhaust fan with a capacity at least equal to the maximum volume of gases to be passed through the fine fiber forming process.

Preferably, the exhaust gas abatement equipment 36 is a conventional dry drum exhaust gas abatement apparatus which can remove fine fibers from an exhaust gas stream, such as dry drum filtration equipment sold by Osprey Corporation or Continental Corporation. As schematically shown in FIG. 1, the dry drum filtration equipment includes a rotating drum filter 54, about ten feet in diameter by about nineteen feet long, which carries a filter media 56 on its cylindrical collection surface for removing fine fibers from the exhaust gas stream passing through the filter media. As the drum filter 54 rotates the filter media 56 is passed by vacuum nozzles 58 of a vacuum system which remove the fine fibers from the filter media 56 and pneumatically convey the fine fibers into a conventional cyclone separator or similar means (not shown) where the fine fibers are separated from the gases and collected for packaging or further processing.

In a manufacturing operation using the method and apparatus of the present invention, the exhaust gases passing from the collection drum to the exhaust gas abatement equipment were evaporatively cooled using four spray nozzles and a total of four gallons/minute of water. The temperature at the exhaust gas abatement equipment was reduced from 320° F. to 250 F., a reduction of 70° F., and no wet fiber wad formation was observed. In this same use of the method and apparatus of the present invention, the temperature of the fiber containing stream of combustion gases and inspirated air at the collection drum was reduced by 11° F. from 345° F. to 334° F.

Figure 4:
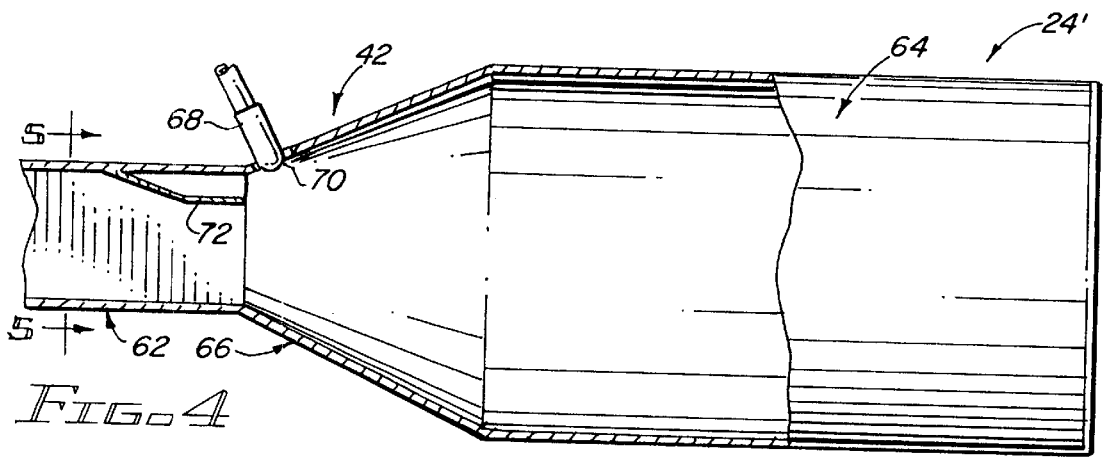
FIG. 4 is a schematic side view of a preferred forming tube with the evaporative cooling equipment therein.

While the forming tubes 24 used in the process can have a constant diameter with a constricted inlet opening 60, as schematically shown in FIGS. 1–3, the preferred configuration for the forming tubes 24' is shown in FIGS. 4 and 5. In the preferred forming tube configuration, the forming tube 24' has a constricted section 62 which has the same size and cross sectional shape as or essentially the same size and cross sectional shape as inlet opening 60; an outlet section 64 which is the same diameter as the forming tube 24; and an expansion section 66 which connects the constricted section 62 with the outlet section 64. The preferred forming tube design, minimizes gas stream turbulence adjacent the evaporative cooling system 42 to prevent fine fiber buildup on the water spray nozzle 68 of the evaporative cooling system 42. While the transverse cross section of the forming tubes 24 and 24' are shown as essentially round, the transverse cross section of the forming tubes can be square, rectangular, oval, flat oval or other configurations.

Figure 6:
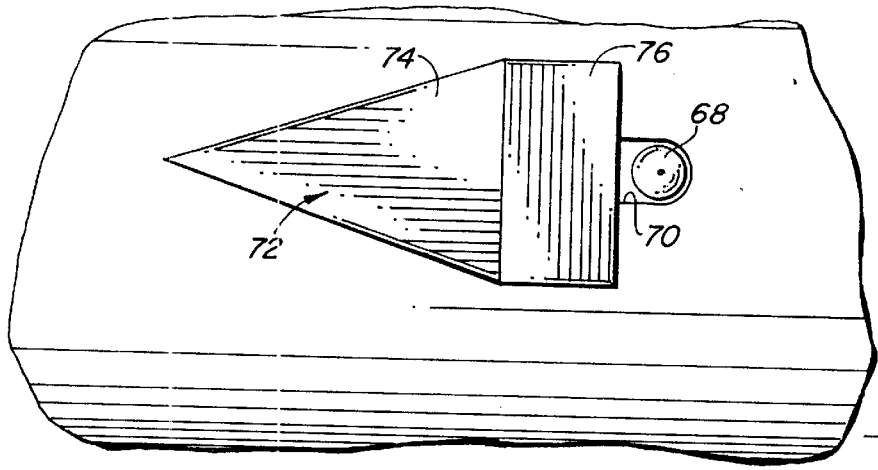
FIG. 6 is a schematic view, from the inside of a forming tube or exhaust duct, of the nozzle scoop and spray nozzle of the evaporative cooling equipment used in the apparatus and method of the present invention.
Figure 7:
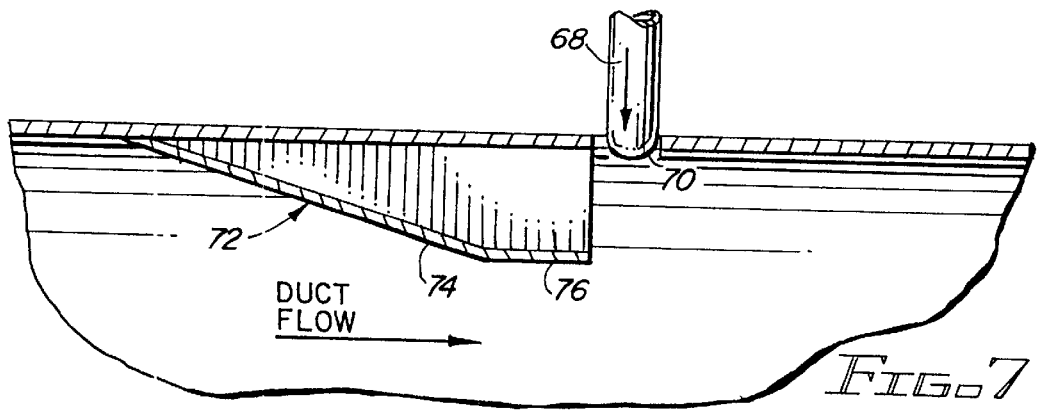
FIG. 7 is a side schematic view of the nozzle scoop and spray nozzle of the evaporative cooling equipment used in the apparatus and method of the present invention.

As shown in FIGS. 6 and 7, the evaporative cooling system 42 for the forming tubes 24 or 24' includes the water spray nozzle 68, a nozzle insertion port 70, and an aerodynamic nozzle shield or scoop 72 for shielding the nozzle 68 from the gas stream carrying the fine fibers. The nozzle insertion port 70 is larger in diameter than the water spray nozzle 68 so that outside air can be inspirated into the forming tubes through the nozzle insertion port 70 to prevent fine fibers, carried by the gas stream, from attaching to the nozzle and forming a wad of fibers that can interfere with the spray pattern of the nozzle and later be detached and carried by the gas stream to the collection surface where it could plug or clog the perforations in the collection surface.

As shown in FIGS. 6 and 7, the downstream end of the nozzle shield or scoop 72 is preferably located immediately upstream of the nozzle insertion port 70. Preferably, the upstream portion 74 of the nozzle shield or scoop 72 has a generally conical surface which expands in the downstream direction and merges into a downstream portion 76 of the nozzle shield or scoop which has a generally cylindrical surface. While a transverse section through the upstream portion 74 or the downstream portion 76 of the nozzle shields or scoops 72, as shown, perpendicular to the longitudinal axis of the forming tube 24 or 24', would have a generally circular curvature, the transverse curvature of the nozzle shields or scoops 72 can have other, preferably aerodynamic, curvatures or shapes, such as, but not limited to oval curvatures, flattened oval curvatures and the like. While not preferred, it is also contemplated that the nozzle shields or scoops 72 could have a generally rectangular transverse cross section, expanding in the downstream direction, with rounded corners. By way of example, for a forming tube about sixteen inches in diameter, the nozzle shield 72 is typically about eight inches long and about two inches deep at its downstream end.

The water spray nozzle 68 is selected to provide a spray of very fine droplets e.g. about 30 microns or less in size, which will evaporate in the gas stream before impacting the collection surface so that the water from the spray does not wet the fine fibers in the gas stream or the collection surface of the collection drum 28. Various nozzles may be used such as, but not limited to, high pressure (e.g. about 1000 psi) hydraulic nozzles; air atomized hydraulic nozzles (e.g. water about 80 psi and air about 40 psi); and air atomized hydraulic nozzles of the type just identified with ultra-sonic resonator caps at the nozzle exit to further shatter the water droplets. The pattern of the spray emitted by the nozzle 68 is selected to avoid contact with the inside surface of the forming tubes 24 or 24' so that the inside surface of the forming tube 24 or 24' does not become wet. If the inside surface of the forming tube 24 or 24' becomes wet, fine fibers will become wet, stick to the surface and buildup into a wet wad or clump of fine fibers on the surface. At a certain point in its growth, the wet wad or clump of fine fibers will be detached from the inside surface of the forming tube by the gas stream and carried to the collection surface of the collection drum 28 where the wad or clump of wet fibers can clog the perforations in the collection surface.

In a forming tube with a round cross section, such as forming tubes 24 and 24', the nozzle used is selected to have a spray pattern which is widest at the opposed diameter of the forming tube. While the evaporative cooling system has been described in terms of one nozzle, insertion port and nozzle shield assembly per forming tube 24 or 24', which is the preferred system, additional nozzle, insertion port and nozzle shield assemblies can be included in the forming tubes 24 and 24' if necessary.

In operation, the fine fiber containing gas stream of burner combustion gases and inspirated air pass into the inlet openings of the forming tubes 24 or 24'; past the evaporative cooling systems 42; and out the discharge ends of the forming tubes 24 or 24' where the gas streams impact the primary fine fiber collection surface of the collection drum 28. In the preferred design of the forming tubes, forming tubes 24', the constricted sections 62 of the forming tubes permit the gas streams of combustion gases and inspirated air to establish a more laminar flow, than the gas streams in forming tubes 24, to minimize turbulence within the forming tubes that could carry fine fibers from the gas streams into contact with the water spray nozzles 68 where the fine fibers could form into a wad. In addition, the expansion sections 66 of the forming tubes 24' cause a rapid expansion of the gases in the gas streams to further increase the negative pressure present within the forming tubes 24' and draw outside air into the forming tubes 24' through the nozzle insertion ports 70.

The nozzle shields or scoops 72 directly shield the nozzles 68 from the gas streams and also create a venturi effect within the forming tubes 24 or 24' to draw air into the forming tubes through the nozzle insertion ports 70. The flow of air into the forming tubes 24 or 24' through the nozzle insertion ports 70 and around the nozzles 68 further acts to keep fine fibers in the gas streams from coming into contact with the nozzles 68.

The nozzles 68 emit sprays of fine water droplets into the streams of combustion gases and inspirated air which evaporate in the gas streams of combustion gases and inspirated air before the gas streams reach the primary collection surface. The evaporation of the water droplets cools the gas streams to reduce the temperatures surrounding the collection drum 28 in the collection chamber 26 thereby prolonging the service life of seals, doffing roll flights and other components of the collection drum which are more susceptible to deterioration at high operating temperatures.

By not wetting the insides of the forming tubes and keeping the fine fibers from collecting on the nozzles 68, wet wads or clumps of fibers are not created in the forming tubes which can be carried by the gas streams to the collection drum where the wads can clog the perforations in the collection surface. By having the droplets in the water sprays sized to evaporate prior to contact with the collection surface of the collection drum 28, the fine fibers are not wetted and dry fine fibers can be collected on the collection drum 28 and later removed for further processing or packaging.

The cooling of the gas streams in the forming tubes 24 or 24' also reduces the temperature of the exhaust gases withdrawn from the collection drum 28 and passed through the exhaust gas abatement equipment 36 thereby prolonging the service life of the filter media and other temperature sensitive components of the drum filter.

Like the evaporative cooling system 42 located in the forming tubes 24 or 24', the evaporative cooling system 44 located in the exhaust duct 34 includes the water spray nozzle 68, a nozzle insertion port 70, and an aerodynamic nozzle shield or scoop 72 for shielding the nozzle 68 from the exhaust gas stream carrying the fine fibers. The nozzle insertion port 70 is larger in diameter than the water spray nozzle 68 so that outside air can be inspirated into the exhaust duct 34 through the nozzle insertion port 70 to prevent fine fibers, carried by the exhaust gas stream, from attaching to the nozzle and forming a wad of fibers that can interfere with the spray pattern of the nozzle and later be detached and carried by the gas stream to the dry drum filter where it could plug or clog the filter media of the filter drum.

As in the evaporative cooling system 42 located in the forming tubes 24 or 24', the downstream end of the nozzle shield or scoop 72 of the evaporative cooling system 44 is preferably located immediately upstream of the nozzle insertion port 70. Preferably, the upstream portion 74 of the nozzle shield or scoop 72 has a generally conical surface which expands in the downstream direction and merges into a downstream portion 76 of the nozzle shield or scoop which has a generally cylindrical surface. Like the nozzle shields or scoops used in the evaporative cooling system 42, the nozzle shields or scoops 72 used in the evaporative cooling system 44 can have other, preferably aerodynamic, curvatures or shapes, such as, but not limited to oval curvatures, flattened oval curvatures and the like. While not preferred, it is also contemplated that the nozzle shields or scoops 72 could have a generally rectangular transverse cross section, expanding in the downstream direction, with rounded corners. Typically, the nozzle shield 72 used in the evaporative cooling system 44 is about eight inches long and about two inches deep at its downstream end.

The water spray nozzle 68 for the evaporative cooling system 44 is selected to provide a spray of very fine droplets e.g. about 170 microns or less in size, which will evaporate in the exhaust gas stream before impacting the filter media 56 of the filter drum 54 so that the water from the spray does not wet the fine fibers in the exhaust gas stream or the filter media 56 of the filter drum 54. As with the evaporative cooling system 42, the evaporative cooling system 44 may used various nozzles such as, but not limited to, high pressure (e.g. about 1000 psi) hydraulic nozzles; air atomized hydraulic nozzles (e.g. water about 80 psi and air about 40 psi); and air atomized hydraulic nozzles of the type just identified with ultra-sonic resonator caps at the nozzle exit to further shatter the water droplets. The pattern of the spray emitted by the nozzle 68 is selected to avoid contact with the inside surface of the exhaust duct 34 so that the inside surface of the exhaust duct does not become wet. If the inside surface of the exhaust duct becomes wet, fine fibers will become wet, stick to the surface and buildup into a wet wad or clump of fine fibers on the surface. At a certain point in its growth, the wet wad or clump of fine fibers will be detached from the inside surface of the exhaust duct by the exhaust gas stream and carried to the filter media 56 of the filter drum 54 where the wad or clump of wet fibers can clog the interstices in the filter media 56.

While the evaporative cooling system 44 has been described in terms of one nozzle, insertion port and nozzle shield assembly, the exhaust duct typically has a rectangular cross section and is larger in size than the forming tubes 24 or 24'. Accordingly, there are typically one, two, three or more additional nozzle, insertion port and nozzle shield assemblies located in the exhaust duct 34. The exhaust duct 34 may have other than a rectangular transverse cross section, such as but not limited to, round, oval, flat oval and square. Preferably, each of the nozzle, insertion port and nozzle shield assemblies are located on a different wall of the exhaust duct or are equally spaced around the exhaust duct at the same location along the longitudinal axis of the exhaust duct 34.

In a preferred embodiment of the evaporative cooling system 44 shown in FIG. 8, the exhaust duct 34 has an expansion section 80 therein. The expansion section 80 is typically much larger in diameter than the exhaust duct 34 in general, e.g. seven feet in diameter vs four feet in diameter, and includes an upstream expansion portion 82 and a downstream reduction portion 84. As with the expansion sections 66 in the forming tubes, the water spray nozzle, nozzle insertion port and aerodynamic nozzle shield or scoop assemblies are preferably located adjacent the upstream expansion portion 82 of the expansion section 80. As with the expansion sections 66 of the forming tubes 24', the expansion section 80 causes a rapid expansion of the gases in the exhaust gas stream to further increase the negative pressure present within the exhaust duct and draw outside air into the exhaust duct 34 through the nozzle insertion ports 70.

In operation the exhaust gas stream containing fine fibers not collected by the primary collection surface of the collection drum 28 pass from the collection drum into the exhaust duct 34, past the evaporative cooling system 44, through the exhaust gas abatement equipment 36 and out the exhaust stack 40. The nozzle shields or scoops 72 directly shield the nozzles 68 of the evaporative cooling system 44 from the exhaust gas stream and also create a venturi effect within the exhaust duct 34 to draw air into the exhaust duct through the nozzle insertion ports 70. The flow of air into the exhaust duct through the nozzle insertion ports 70 and around the nozzles 68 further acts to keep fine fibers in the exhaust gas stream from coming into contact with the nozzles 68.

The nozzles 68 emit sprays of fine water droplets into the exhaust gas stream which evaporate in the exhaust gas stream before the exhaust gas stream impacts the filter media 56 of the filter drum 54 (the secondary fine fiber collection media). The evaporation of the water droplets cools the exhaust gas stream to reduce the temperatures surrounding the filter drum 54 and thereby prolong the service life of the filter media (typically a fibrous filter media), seals, and other components of the exhaust gas abatement equipment 36 which are more susceptible to deterioration at high operating temperatures.

By not wetting the inside of the exhaust duct and keeping the fine fibers from collecting on the nozzles 68, wet wads or clumps of fibers are not created in the exhaust duct 34 which can be carried by the exhaust gas stream to the filter drum 54 where the wads can clog the filter media 56. By having the droplets in the water sprays sized to evaporate prior to contact with the filter media 56 on the filter drum 54, the fine fibers and the filter media 56 are not wetted and dry fine fibers can be collected by the filter media on the filter drum 28 and later removed by the vacuum nozzles 58 for further processing or packaging.

By cooling of the exhaust gas stream in the exhaust duct 34, for a constant volume of exhaust gases drawn through the exhaust fan 38, more air is inspirated into the gas stream of combustion gases and air carrying fine fibers to the primary collection surface on the collection drum 28. Thus, the temperatures in the collection chamber 26 surrounding the collection drum 28 can be reduced thereby prolonging the service life of the seals, doffing roll flights and other temperature sensitive components of the collection drum 28.

When both evaporative cooling systems 42 and 44 are used together, the cooling effects of both systems can be combined to cool the operating temperatures surrounding both the collection drum 28 and the exhaust gas abatement equipment 36 without wetting the fibers so that there can be a primary and a secondary collection of the fine fibers in the process.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An apparatus for making fine fibers comprising:

primary fine fiber collection means;

fiberizing means for forming fine fibers and conveying said fine fibers to said primary fine fiber collection means by means of a fine fiber containing high energy, high temperature gaseous stream;

forming tube means, intermediate said fiberizing means and said primary fine fiber collection means, through which said fine fiber containing high energy, high temperature gaseous stream travels from said fiberizing means to said primary fine fiber collection means; and evaporative cooling means in said forming tube means for lowering the temperature of said fine fiber containing high energy, high temperature gaseous stream, without wetting said fine fibers, before said fine fiber containing high energy, high temperature gaseous stream impacts said primary fine fiber collection means so that temperatures at said primary fine fiber collection means are lowered and fine fibers collected by said primary fine fiber collection means are collected dry.

2. The apparatus for making fine fibers according to claim 1, wherein:

said evaporative cooling means includes water spray nozzle means located in nozzle port means of said forming tube means intermediate upstream and downstream ends of said forming tube means; and nozzle scoop means for shielding said water spray nozzle means from said fiber containing high energy, high temperature gaseous stream to prevent fiber buildup on said water spray nozzle means by directly shielding said water spray nozzle means from said fiber containing high energy, high temperature gaseous stream and by creating a venturi effect within said forming tube means, adjacent said water spray nozzle means, to draw air into said forming tube means through said nozzle port means.

3. The apparatus for forming fine fibers according to claim 2, wherein: said water spray nozzle means emits a spray of water with a spray pattern that does not wet an inside surface of said forming tube means and droplets of said spray of water are sized to evaporate before said fine fiber containing high energy, high temperature gaseous stream impacts said primary fine fiber collection means.

4. The apparatus for forming fine fibers according to claim 3, wherein: said forming tube means has a round cross section and said spray pattern of said water spray nozzle means is widest across a diameter of said forming tube means so that said water spray does not wet said inside surface of said forming tube means.

5. The apparatus for forming fine fibers according to claim 4, wherein: said water spray nozzle means and said nozzle scoop means are located in said forming tube means adjacent an upstream end of an expansion section of said forming tube means that expands in transverse cross section in a downstream direction.

6. The apparatus for forming fine fibers according to claim 2, wherein: said water spray nozzle means and said nozzle scoop means are located in said forming tube means adjacent an upstream end of an expansion section of said forming tube means wherein said forming tube means expands in transverse cross section in a downstream direction.

7. The apparatus for forming fine fibers according to claim 2, wherein: said forming tube means comprises a plurality of forming tubes; and said water spray nozzle means comprises a water spray nozzle in each of said forming tubes.

8. The apparatus for making fine fibers according to claim 1, including:

exhaust gas abatement means for drawing gases of said fine fiber containing high energy, high temperature gaseous stream through said primary fine fiber collection means, forming an exhaust gas stream of said gases, and passing said exhaust gas stream through a secondary fiber collection means to remove fine fibers remaining in said exhaust gas stream from said exhaust gas stream prior to discharging said exhaust gas stream to the atmosphere; and exhaust gas evaporative cooling means in said exhaust gas abatement means, intermediate said primary fine fiber collection means and said secondary fine fiber collection means for lowering the temperature of said exhaust gas stream, without wetting said fine fibers in said exhaust gas stream, before said exhaust gas stream impacts said secondary fine fiber collection means so that temperatures at said secondary fine fiber collection means are lowered and fine fibers removed from said exhaust gas stream by said secondary fine fiber collection means are collected dry.

9. The apparatus for making fine fibers according to claim 8, wherein:

said exhaust gas evaporative cooling means is located in an exhaust duct intermediate said primary fine fiber collection means and said secondary fine fiber collection means; and said exhaust gas evaporative cooling means includes second water spray nozzle means located in second nozzle port means of said exhaust duct intermediate upstream and downstream ends of said exhaust duct; and second nozzle scoop means for shielding said second water spray nozzle means from said exhaust gas stream to prevent fiber buildup on said second water spray nozzle means by directly shielding said second water spray nozzle means from said exhaust gas stream and by creating a venturi effect within said exhaust duct, adjacent said second water spray nozzle means, to draw air into said exhaust duct through said second nozzle port means.

10. The apparatus for forming fine fibers according to claim 9, wherein: said second water spray nozzle means emits a spray of water with a spray pattern that does not wet an inside surface of said exhaust duct and droplets of said spray of water are sized to evaporate before said exhaust gas stream reaches said secondary fine fiber collection means.

11. The apparatus for forming fine fibers according to claim 8, wherein: said primary fine fiber collection means is a perforated surface of a rotating metallic drum; and said secondary fine fiber collection means is fibrous filtration media on a rotating drum.

12. An apparatus for making fine fibers comprising:

a primary fine fiber collection means;

fiberizing means for forming fine fibers and conveying said fine fibers to said primary fine fiber collection means by means of a fine fiber containing high energy, high temperature gaseous stream;

forming tube means, intermediate said fiberizing means and said primary fine fiber collection means, through which said fine fiber containing high energy, high temperature gaseous stream travels from said fiberizing means to said primary fine fiber collection means;

exhaust gas abatement means for drawing gases of said fine fiber containing high energy, high temperature gaseous stream through said primary fine fiber collection means, forming an exhaust gas stream of said gases, and passing said exhaust gas stream through a secondary fiber collection means to remove fine fibers remaining in said exhaust gas stream from said exhaust gas stream prior to discharging said exhaust gas stream to the atmosphere; and exhaust gas evaporative cooling means in said exhaust gas abatement means, intermediate said primary fine fiber collection means and said secondary fine fiber collection means for lowering the temperature of said exhaust gas stream, without wetting said fine fibers in said exhaust gas stream, before said exhaust gas stream impacts said secondary fine fiber collection means so that temperatures at said primary fine fiber collection means and said secondary fine fiber collection means are lowered and fine fibers removed from said gases of said exhaust gas stream by said secondary fine fiber collection means are collected dry.

13. The apparatus for making fine fibers according to claim 12, wherein:

said exhaust gas evaporative cooling means is located in an exhaust duct intermediate said primary fine fiber collection means and said secondary fine fiber collection means; and said exhaust gas evaporative cooling means includes water spray nozzle means located in nozzle port means of said exhaust duct intermediate upstream and downstream ends of said exhaust duct; and nozzle scoop means for shielding said water spray nozzle means from said exhaust gas stream to prevent fiber buildup on said water spray nozzle means by directly shielding said water spray nozzle means from said exhaust gas stream and by creating a venturi effect within said exhaust duct, adjacent said water spray nozzle means, to draw air into said exhaust duct through said nozzle port means.

14. The apparatus for making fine fibers according to claim 13, wherein: said exhaust gas evaporative cooling means is located in said exhaust duct immediately upstream of an expansion section of said exhaust duct.

15. A method of making fine fibers comprising:

providing primary fine fiber collection means;

forming fine fibers with a fiberizing means;

conveying said fine fibers to said primary fine fiber collection means, by means of a fine fiber containing high energy, high temperature gaseous stream, through forming tube means located intermediate said fiberizing means and said primary fine fiber collection means;

evaporatively cooling said fine fiber containing high energy, high temperature gaseous stream to lower the temperature of said fine fiber containing high energy, high temperature gaseous stream before said fine fiber containing high energy, high temperature gaseous stream impacts said primary fine fiber collection means, without wetting said fine fibers, so that temperatures at said primary fine fiber collection means are lowered; and collecting dry fine fibers from said high energy, high temperature gaseous stream with said primary fine fiber collection means.

16. The method of making fine fibers according to claim 15, wherein:

said fine fiber containing high energy, high temperature gaseous stream is evaporatively cooled by spraying water from nozzle means located in nozzle port means of said forming tube means, intermediate upstream and downstream ends of said forming tube means; and said nozzle means is shielded by nozzle scoop means from said fiber containing high energy, high temperature gaseous stream to prevent fiber buildup on said nozzle means by directly shielding said nozzle means from said fiber containing high energy, high temperature gaseous stream and by creating a venturi effect within said forming tube means, adjacent said nozzle means, to draw air into said forming tube means through said nozzle port means.

17. The method of forming fine fibers according to claim 16, wherein: said nozzle means emits a spray of water with a spray pattern that does not wet an inside surface of said forming tube means and droplets of said spray of water are sized to evaporate before said fine fiber containing high energy, high temperature gaseous stream reaches said primary fine fiber collection means.

18. The method of forming fine fibers according to claim 17, wherein: said forming tube means has a round cross section and said spray pattern of said nozzle means is widest across a diameter of said forming tube means so that said water spray does not wet said inside surface of said forming tube means.

19. The method of forming fine fibers according to claim 18, wherein: said nozzle means and said nozzle scoop means are located in said forming tube means adjacent an upstream end of an expansion section of said forming tube means that expands in transverse cross section in a downstream direction to create a venturi effect within said forming tube means to draw air into said forming tube means through said nozzle port means.

20. The method of forming fine fibers according to claim 16, wherein: said nozzle means and said nozzle scoop means are located in said forming tube means adjacent an upstream end of an expansion section of said forming tube means that expands in transverse cross section in a downstream direction to create a venturi effect within said forming tube means to draw air into said forming tube means through said nozzle port means.

21. The method of making fine fibers according to claim 15, including:

drawing gases of said fine fiber containing high energy, high temperature gaseous stream through said primary fine fiber collection means, forming an exhaust gas stream of said gases, and passing said exhaust gas stream through a secondary fiber collection means to remove fine fibers remaining in said exhaust gas stream from said exhaust gas stream prior to discharging said exhaust gas stream to the atmosphere;

evaporatively cooling said exhaust gas stream intermediate said primary fine fiber collection means and said secondary fine fiber collection means without wetting said fine fibers in said exhaust gas stream to lower the temperature of said exhaust gas stream before said exhaust gas stream impacts said secondary fine fiber collection means so that temperatures at said secondary fine fiber collection means are lowered and fine fibers removed from said exhaust gas stream by said secondary fine fiber collection means are collected dry; and collecting dry fine fibers with said secondary fine fiber collection means.

22. The method of making fine fibers according to claim 21, wherein:

said exhaust gas stream is evaporatively cooled in an exhaust duct intermediate said primary fine fiber collection means and said secondary fine fiber collection means by spraying water into said exhaust gas stream with second nozzle means located in second nozzle port means of said exhaust duct intermediate upstream and downstream ends of said exhaust duct; and said second nozzle means is shielded by second nozzle scoop means from said exhaust gas stream to prevent fiber buildup on said second nozzle means by directly shielding said second nozzle means from said exhaust gas stream and by creating a venturi effect within said exhaust duct, adjacent said second nozzle means, to draw air into said exhaust duct through said second nozzle port means.

23. The method of forming fine fibers according to claim 22, wherein: said second nozzle means emits a spray of water with a spray pattern that does not wet an inside surface of said exhaust duct and droplets of said spray of water are sized to evaporate before said exhaust gas stream reaches said secondary fine fiber collection means.

24. The method of forming fine fibers according to claim 21, wherein: said primary fine fiber collection surface is a perforated surface of a rotating metallic drum; and said secondary fine fiber collection surface is fibrous filtration media on a rotating drum.

25. A method of making fine fibers comprising:

providing primary fine fiber collection means;

forming fine fibers with a fiberizing means;

conveying said fine fibers to said primary fine fiber collection means by means of a fine fiber containing high energy, high temperature gaseous stream through forming tube means located intermediate said fiberizing means and said primary fine fiber collection means;

collecting fine fibers from said fine fiber containing high energy, high temperature gaseous stream with said primary fine fiber collection means;

drawing gases of said fine fiber containing high energy, high temperature gaseous stream through said primary fine fiber collection means, forming an exhaust gas stream of said gases, and passing said exhaust gas stream through a secondary fiber collection means to remove fine fibers remaining in said exhaust gas stream from said exhaust gas stream prior to discharging said exhaust gas stream to the atmosphere; and evaporatively cooling said exhaust gas stream, intermediate said primary fine fiber collection means and said secondary fine fiber collection means without wetting said fine fibers in said exhaust gas stream to lower the temperature of said exhaust gas stream before said exhaust gas stream impacts said secondary fine fiber collection means and to lower the temperature of said fine fiber containing high energy, high temperature gaseous stream before said fine fiber containing high energy, high temperature gaseous stream impacts said primary fine fiber collection means; and collecting dry fine fibers from said exhaust gas stream with said secondary fine fiber collection means.

26. The method of making fine fibers according to claim 25, wherein:

said exhaust gas stream is evaporatively cooled in an exhaust duct intermediate said primary fine fiber collection means and said secondary fine fiber collection means by spraying water into said exhaust gas stream with nozzle means located in nozzle port means of said exhaust duct intermediate upstream and downstream ends of said exhaust duct; and said nozzle means is shielded by nozzle scoop means from said exhaust gas stream to prevent fiber buildup on said nozzle means by directly shielding said nozzle means from said exhaust gas stream and by creating a venturi effect within said exhaust duct, adjacent said nozzle means, to draw air into said exhaust duct through said nozzle port means.

* * * * *